United States Patent [19]
Jain

[11] Patent Number: 5,551,257
[45] Date of Patent: Sep. 3, 1996

[54] PRODUCTION OF ULTRAHIGH PURITY NITROGEN

[75] Inventor: Ravi Jain, Piscataway, N.J.

[73] Assignee: The BOC Group, Inc., New Providence, N.J.

[21] Appl. No.: 955,180

[22] Filed: Oct. 1, 1992

[51] Int. Cl.$^6$ .................................................. F25J 3/00
[52] U.S. Cl. .................. 62/644; 62/648; 62/908; 95/106; 95/126; 95/130
[58] Field of Search .................. 62/18, 24; 95/106, 95/126, 130

[56] References Cited

U.S. PATENT DOCUMENTS 3,447,331  6/1969  Smith ........................................... 62/22
4,746,332  5/1988  Tomomura et al. ......................... 62/18

*Primary Examiner*—Ronald C. Capossela
*Attorney, Agent, or Firm*—Coleman R. Reap; Larry R. Cassett

[57] ABSTRACT

Apparatus and a process for producing nitrogen or air containing not more than 0.5 ppm by volume of carbon monoxide. A nitrogen stream or air stream containing up to about 100 ppm by volume of carbon monoxide is subjected to cryogenic temperature swing adsorption in an adsorption bed containing calcium-exchanged type X zeolite, type 5A zeolite or 13X zeolite, which removes substantially all of the carbon monoxide from the nitrogen stream or air stream.

15 Claims, 3 Drawing Sheets

PRODUCTION OF ULTRAHIGH PURITY NITROGEN

BACKGROUND OF THE INVENTION

This invention relates to the production of high purity nitrogen, and more particularly to the removal of carbon monoxide from a high purity nitrogen stream by cryogenic adsorption.

Many applications requiring the use of an inert gas, such as nitrogen require that the nitrogen be substantially free of impurities such as carbon monoxide. This is particularly important in the manufacture of computer chips where even very small amounts of impurities can lead to substantial reduction in chip yield. When it is desired to produce high purity nitrogen by cryogenic fractional distillation of air the presence of high boiling, generally noncondensable impurities, such as hydrocarbons, in the air presents no problems, since some of the high boiling impurities can be removed from the feed stream by near ambient temperature adsorption prior to introduction of the air into the distillation system. Hydrocarbons and other high boiling impurities not removed by adsorption leave the distillation system with the oxygen-rich stream. However, if carbon monoxide is present in the air feed as an impurity and it is not removed from the feed stream prior to entry of the feed stream into the distillation system, it will end up in the nitrogen-enriched stream, because its boiling point is very close to that of nitrogen. Conventional removal of carbon monoxide from nitrogen streams requires the use of special techniques, such as high temperature chemisorption or oxidation to carbon dioxide.

Oxidative removal of carbon monoxide requires reaction at temperatures up to 250° C. using platinum-palladium catalysts. Carbon monoixide removal by chemisorption involves the use of copper or nickel based getters/adsorbents at temperatures between 30° and 200° C. Each of these processes significantly adds to the overall cost of high purity nitrogen production.

U.S. Pat. No. 4,746,332 discloses the adsorption of oxygen from a nitrogen stream at cryogenic temperatures using sodium-exchanged A zeolite.

Since most high purity nitrogen is produced by cryogenic distillation, removal of carbon monooxide at cryogenic temperatures would be highly desirable since such a step can be easily integrated into existing processes. The present invention provides such a method.

SUMMARY OF THE INVENTION

According to a broad aspect of the invention, carbon monoxide is removed from an air stream or a nitrogen stream by subjecting the air stream or nitrogen stream to temperature swing adsorption (TSA) in a bed of carbon monoxide-selective adsorbent at cryogenic temperatures. In the case of air purification, the adsorption is carried out at a temperature above the dew point of air and generally up to about 150° C., and preferably in the range of about 90 to about 125° K., and in the case of nitrogen purification the adsorption is carried out at a temperature above the atmospheric pressure boiling point of nitrogen, i.e. 77° K., but below about 150° K., and preferably in the range of about 90 to about 150° K. The adsorption is generally carried out at an absolute pressure of about 1 to about 20 atmospheres. The adsorbent used in the process of the invention is a type A zeolite, a type X zeolite, a type Y xeolite, a mordenite or mixtures of any of these. The adsorbent bed is generally regenerated at a temperature in the range of about −20° to about 250° C. The invention is particularly effective for the removal of up to about 100 ppm of carbon monoxide from nitrogen or air.

In a preferred embodiment of the process of the invention, the adsorbent is calcium exchanged X zeolite, type 5A zeolite, type 13X zeolite or mixtures of any of these.

In a more specific embodiment of the process of the invention substantially carbon monoxide-free nitrogen is produced from carbon monoxide-containing air by one of two alternative procedures:

(a) cryogenically distilling the air, thereby producing a nitrogen-enriched gaseous stream containing the carbon monoxide; then adsorbing carbon monoxide from the nitrogen-enriched gaseous stream by passing the nitrogen-enriched gaseous stream through a bed of carbon monoxide-selective adsorbent at a temperature in the range of about 77 to 150° K. and preferably in the range of about 90 to about 125° K.; or (b) passing the air stream through a bed of carbon monoxide-selective adsorbent at a temperature above the dew point of air at the temperature existing in the bed of adsorbent up to about 150° K., and preferably in the range of about 90 to 125° K., thereby producing substantially carbon monoxide-free air; and cryogenically distilling the substantially carbon monoxide-free air, thereby producing a substantially carbon monoxide-free nitrogen-enriched stream.

The apparatus aspect of the invention comprises a cryogenic temperature swing adsorption system in series with a fractional distillation system in either of two alternative arrangements:

(a) a distillation column having an air inlet means, a gaseous oxygen-enriched stream outlet means and a gaseous nitrogen-enriched stream outlet means, and cryogenic temperature swing adsorption means comprising an adsorbent bed containing at least one adsorbent which more strongly adsorbs carbon monoxide than nitrogen, inlet means in fluid communication with the gaseous nitrogen-enriched stream outlet means, nonadsorbed product gas outlet means and desorbed product gas outlet means; and (b) cryogenic temperature swing adsorption means comprising an adsorbent bed containing at least one adsorbent which more strongly adsorbs carbon monoxide than nitrogen, oxygen and argon, and having nonadsorbed product gas outlet means and desorbed product gas outlet means, and a distillation column having an air inlet means in fluid communication with the nonadsorbed product gas outlet means, a gaseous oxygen-enriched stream outlet means and a gaseous nitrogen-enriched stream outlet means.

In either apparatus alternative the adsorption means contains an adsorbent selected from A type zeolites, X type zeolites, Y type zeolites, mordenites and mixtures thereof, and in preferred embodiments, an adsorbent selected from calcium-exchanged X zeolite, type 5A zeolite, type 13X zeolite and mixtures thereof.

In another preferred embodiment of the apparatus embodiment of the invention, the distillation column additionally has a crude argon side arm distillation column.

BRIEF DESCRIPTION OF THE DRAWINGS

The invention is illustrated in the drawings, in which.

Like characters designate like or corresponding parts throughout the several views. Auxiliary valves, lines and equipment not necessary for an understanding of the invention have been omitted from the drawings.

DETAILED DESCRIPTION OF THE INVENTION

Figure 1:
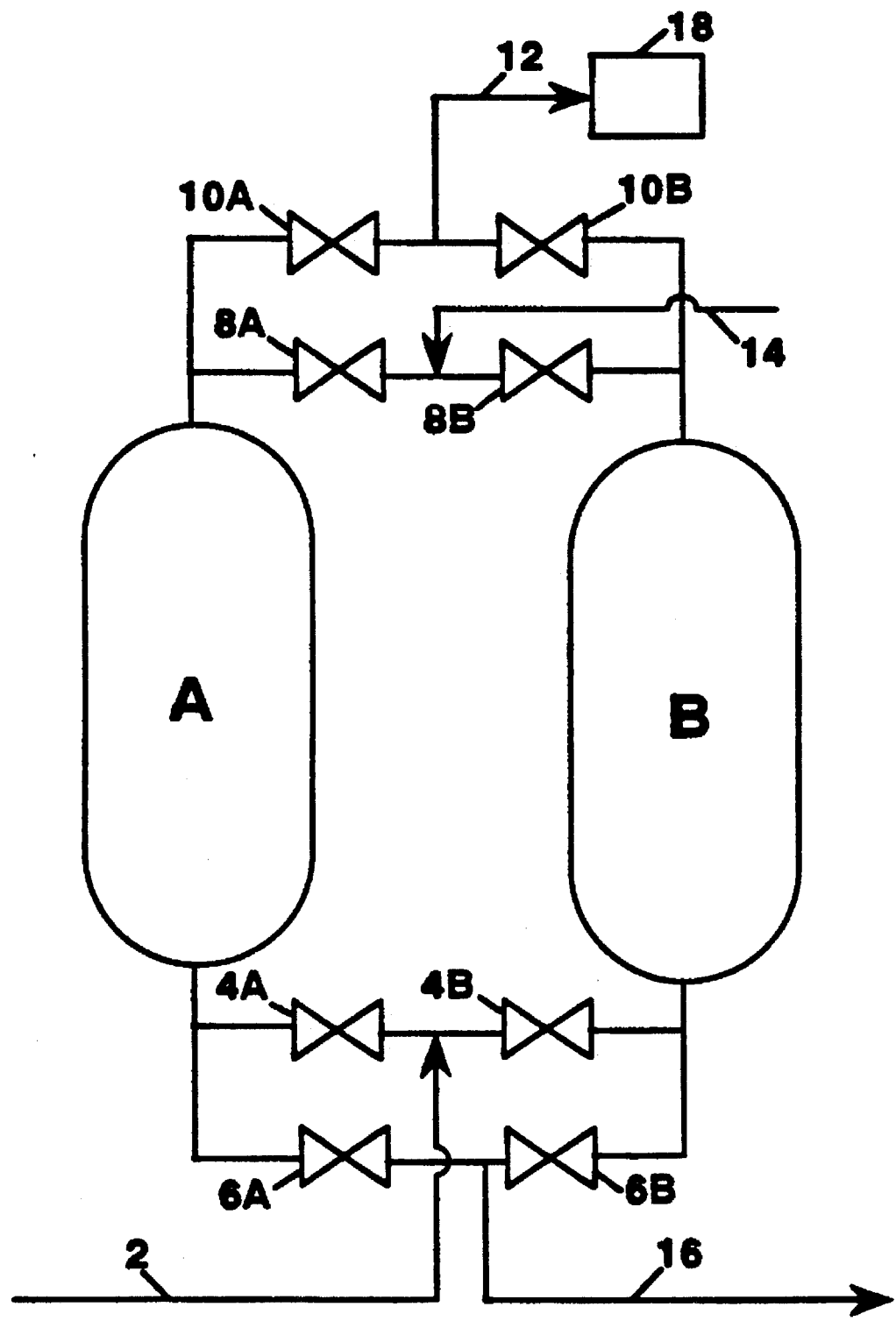
FIG. 1 depicts a cryogenic adsorption system for recovering high purity nitrogen from a nitrogen-rich feed stream in accordance with the principle of the invention.

In the broad aspect of the invention, a nitrogen-enriched gas stream containing carbon monoxide as an impurity is passed through a bed of adsorbent which preferentially adsorbs carbon monoxide from the nitrogen-enriched gas stream at cryogenic temperatures, thereby removing a substantial quantity of the carbon monoxide from the gas stream. The adsorption process operates on a TSA cycle. This aspect of the invention can be carried out in the apparatus illustrated in FIG. 1. The adsorption system illustrated in FIG. 1 is depicted as comprising two parallel arranged beds; however the invention is not limited to a two-bed system. A single bed adsorption system can be used, or the system can comprise more than two parallel-arranged adsorption beds. The number of adsorption beds in the system is not critical to the operation of the invention. In the two bed system illustrated in the drawings, one bed is in the adsorption mode while the other bed is in the regeneration mode.

Adsorbers A and B are identical and each is packed with a bed of particulate adsorbent which adsorbs carbon monoxide in preference to nitrogen. Suitable adsorbents include A, X and Y type zeolites, mordenites, etc. Preferred adsorbents include calcium-exchanged type X zeolite, 5A zeolite and 13X zeolite.

In the adsorption system illustrated in FIG. 1, valves 4A and 4B control the flow of feed gas to beds A and B, respectively; valves 6A and 6B control the flow of purge gas and desorbed gas from adsorbers A and B, respectively; valves BA and BB control the flow of purge gas to adsorbers A and B, respectively; and valves 10A and 10B control the flow of purified nitrogen product gas from adsorbers A and B, respectively.

The operation of the adsorption system will first be described with bed A in the adsorption mode and bed B in the regeneration mode. In this half of the cycle, valves 4A, 6B, 8B and 10A are open and valves 4B, 6A, 8A and 10B are closed. Feed gas enters the adsorption system through line 2, passes through valve 4A and enters adsorber A. As the gas passes through adsorber A, carbon monoxide is preferentially adsorbed therefrom. The carbon monoxide-depleted nitrogen stream, now usually containing no more than about 0.5 ppm by volume carbon monoxide, passes through valve 10A and leaves the adsorption system through line 12. In the embodiment illustrated in FIG. 1, the purified nitrogen is sent to unit 18 which represents user equipment or a downstream process like a nitrogen liquefier or a storage vessel.

While high purity nitrogen is being produced in adsorber A, the bed of adsorbent in adsorber B is being regenerated. During regeneration, a warm purge gas is introduced into adsorber B through line 14 and open valve BB. It is preferred to use high purity nitrogen as the purge gas to avoid contaminating the adsorption beds. Part of the product leaving the system through line 12 can be used as the regeneration purge gas. The warm purge gas passes through bed B, thereby desorbing and sweeping carbon monoxide therefrom. The desorbed carbon monoxide is removed from the system through open valve 6B and line 16. This gas may be completely vented to the atmosphere or a part of it can be reintroduced into the system to recover the nitrogen used as purge gas.

During the course of the adsorption step, the adsorbed gas front in adsorber A progresses toward the outlet end of this unit. When the front reaches a predetermined point in the bed, the first half of the cycle is terminated and the second half is begun.

During the second half of the adsorption cycle, adsorber B is put into adsorption service and the bed in adsorber A is regenerated. During this half of the cycle valves 4B, 6A, 8A and 10B are open and valves 4A, 6B, 8B and 10A are closed. Feed gas now enters the adsorption system through line 2 and passes through adsorber B through valves 4B and 10B and line 12. Meanwhile the bed in adsorber A is being regenerated. During regeneration of the bed in adsorber A, the warm purge gas passes through the adsorber A via line 14, valve 8A, valve 6A and line 16. When the adsorption front in the bed in adsorber B reaches the predetermined point in this bed, the second half of the cycle is terminated, and the cycle is repeated.

The feed to adsorbers A and B is typically at a temperature between the dew point of nitrogen (77° K. at one atmosphere) and 150° K. and at an absolute pressure about 1.0 to 20.0 atmospheres. The rate of flow of the regeneration gas through the system is typically between 5 and 15% of the feed flow rate. The regeneration gas temperature is typically in the range of about −20° and 250° C. The concentration of carbon monoxide impurity in the feed gas is typically less than 100 ppm. Prior to the initial start of nitrogen purification, the beds in adsorbers A and B are heated to temperatures up to 300° C. to remove any residual moisture contained therein. This step is not repeated during the regular operation. A typical cycle for the process is given in Table I below.

TABLE I

Typical Cycle Sequence for the Cryogenic TSA Process of the Invention

| Step | Time, Hr. |
|---|---|
| Pressurize Bed A, purify using Bed B | 0.5 |
| Purify using Bed A, vent Bed B to atmosphere | 0.5 |
| Purify using Bed A, regenerate Bed B with warm purge gas | 8.0 |
| Purify using Bed A, cool Bed B with cold purge | 15.0 |
| Pressurize Bed B, purify using Bed A | 0.5 |
| Purify using Bed B, vent Bed A to atmosphere | 0.5 |
| Purify using Bed B, regenerate Bed A with warm purge gas | 8.0 |
| Purify using Bed B, cool Bed A with cold purge gas | 15.0 |
| Total | 48.0 hr |

Figure 2:
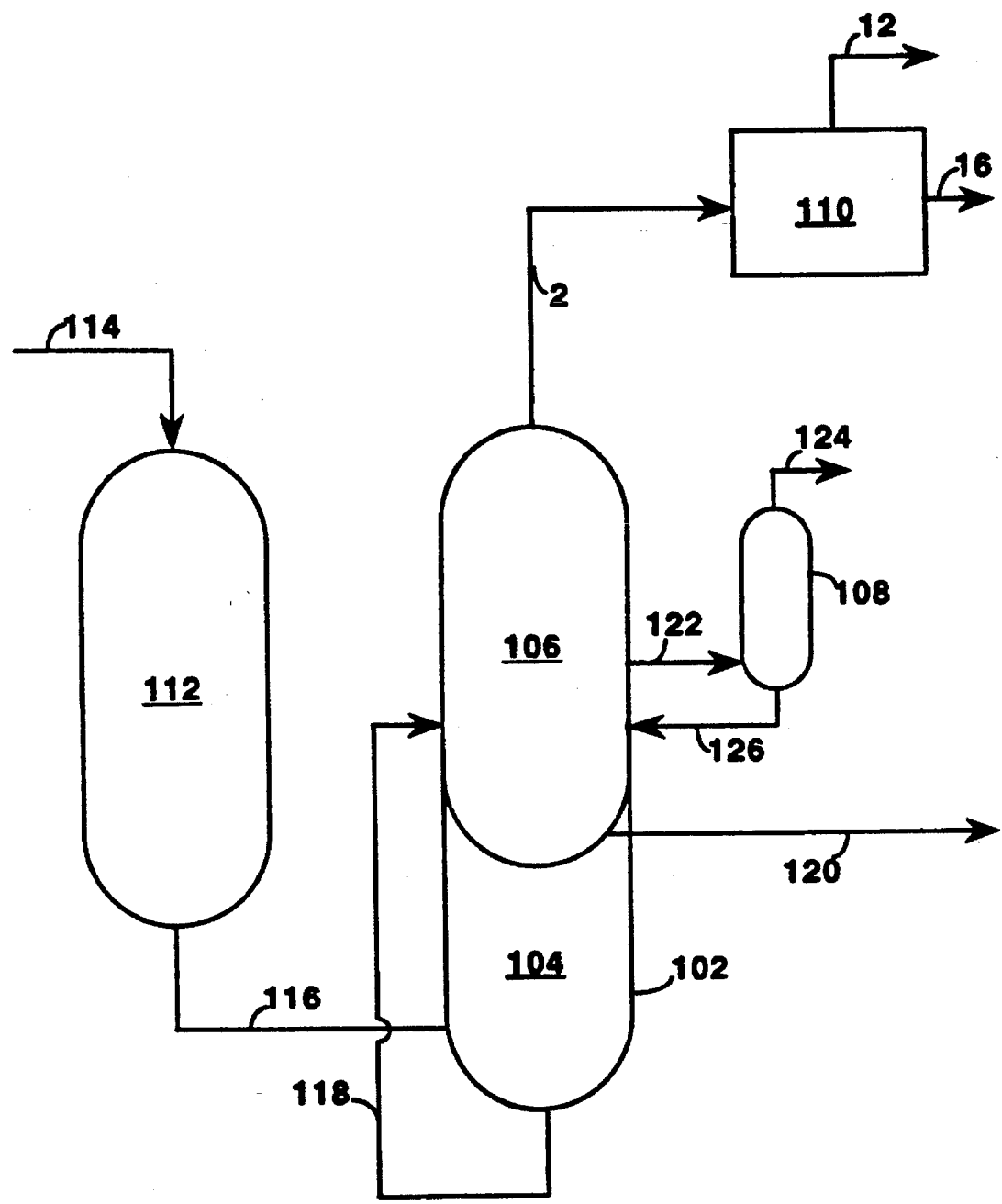
FIG. 2 illustrates a first embodiment of a system in accordance with the invention for producing high purity nitrogen from air.

In the specific aspect of the invention illustrated in FIG. 2, a stream of air containing carbon monoxide is distilled in a distillation column to produce an nitrogen-enriched product stream containing the carbon monoxide, and the nitrogen-enriched product stream is then subjected to the above-described cryogenic temperature swing adsorption process.

Turning now to FIG. 2, the system illustrated therein includes cryogenic distillation unit 102, comprising high pressure column 104 and low pressure column 106, side arm argon distillation unit 108 (optional), cryogenic adsorption system 110, which can be identical to the system illustrated in FIG. 1, and an air prepurification unit 112. When nitrogen is the sole desired product only the high pressure column is used, and the air feed is near the bottom of the column.

In the operation of the system of FIG. 2, a compressed stream of air is introduced into prepurification unit 112 through line 114. Unit 112 is typically an adsorptive purification unit or a reversing heat exchanger, when it is an adsorptive purification unit it contains a bed of adsorbent which preferentially adsorbs moisture and carbon dioxide from the air stream. As the air stream passes through unit 112, unsaturated hydrocarbons such as ethylene, propylene, etc. and higher molecular weight saturated hydrocarbons, for example $C_4$ and higher alkanes, are also generally adsorbed from the air stream. Lower hydrocarbons possibly remaining in the stream exiting unit 112 include methane, ethane, and traces of ethylene and propane. When a reversing heat exchanger is used, water and carbon dioxide (but generally not hydrocarbons) are removed from the feed air by freezing as the air passes through the unit. The pre-purified air stream leaving unit 112 is cooled and then introduced into high pressure column 104 of unit 102 via line 116. A liquefied oxygen-rich bottoms stream is removed from high pressure column 104 through line 11B and introduced into low pressure column 106. The oxygen-rich stream is rectified in column 106 into a nitrogen product stream, which leaves column 106 through line 2, and an oxygen product stream, which leaves column 106 through line 120. Any hydrocarbons present in the stream entering unit 102 are removed from the system with the oxygen product stream.

When unit 102 is equipped with argon side arm distillation column 108, an argon-rich stream is removed from low pressure column 106 via line 122 at a point intermediate nitrogen product stream removal line 2 and oxygen product removal line 120. In column 108, the argon-rich stream is rectified into a crude argon stream, which leaves column 108 through line 124, and an oxygen-rich recycle stream, which is returned to column 106 through line 126.

The nitrogen-rich product stream leaving column 106 through line 2 contains the carbon monoxide that was present in the air feed stream. The carbon monoxide is removed from the nitrogen product stream in unit 110, as described above with reference to FIG. 1, thereby producing a carbon monoxide-depleted nitrogen stream, which leaves unit 110 through line 12, and a waste stream which leaves unit 110 through line 16. Part of the waste stream may be returned to the distillation column 102 for enhanced nitrogen recovery, if desired. For efficient operation of unit 110, the stream entering this unit should be in the vapor form. The operating conditions for cryogenic adsorption system 110 in this embodiment include a temperature between about 77° and 150° K., and preferably a temperature in the range of about 80° to 125° K., and a pressure between 1.0 and 20.0 atmospheres.

Figure 3:
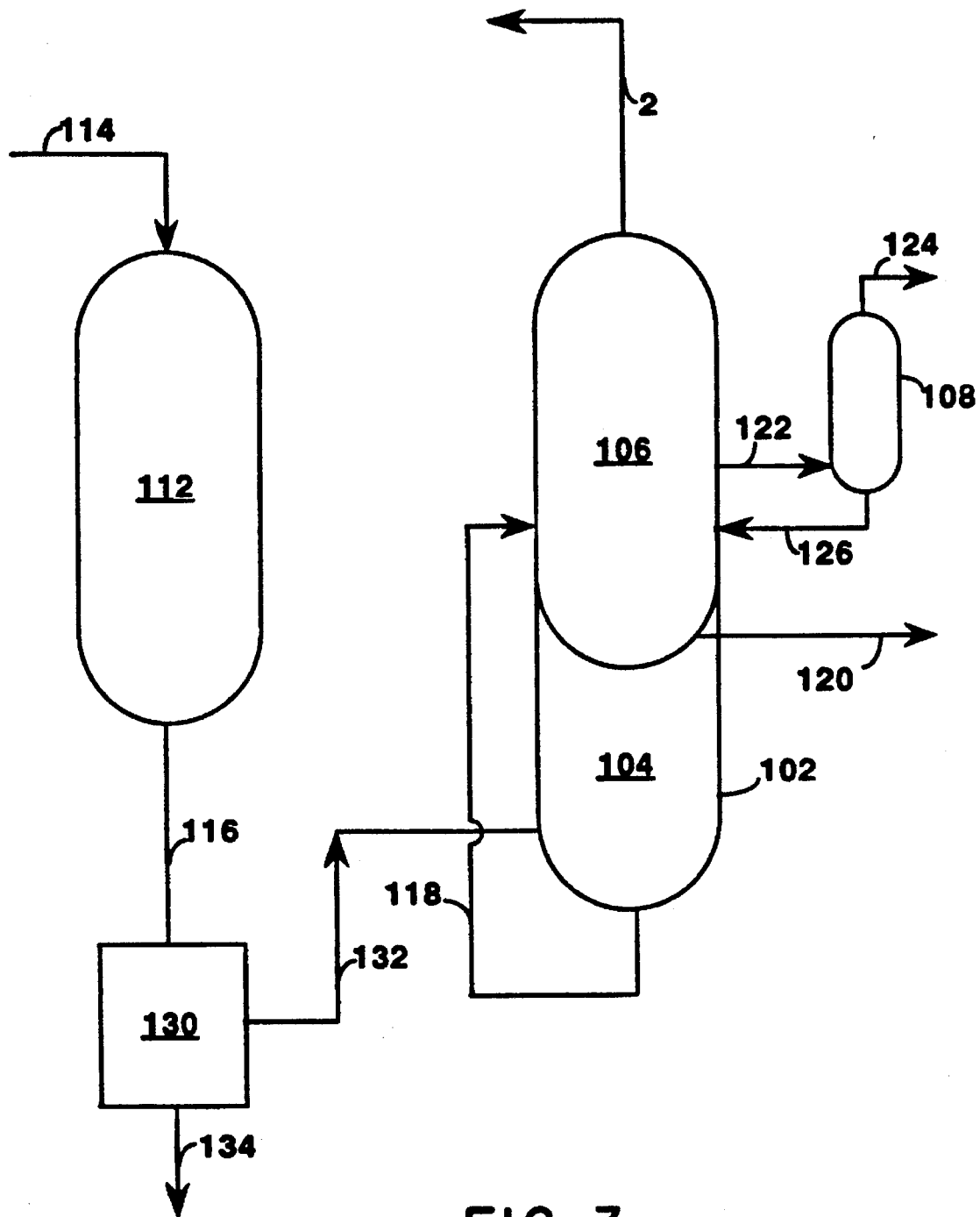
FIG. 3 illustrates a second embodiment of a system in accordance with the invention for producing high purity nitrogen from air.

The system of FIG. 3 is similar to the system of FIG. 2 except that cryogenic adsorption unit 110 of FIG. 2 is eliminated and replaced by cryogenic adsorption unit 130 of FIG. 3. Unit 130 can be the adsorption system illustrated in FIG. 1, and generally contains the same adsorbents. At cryogenic temperatures these adsorbents adsorb carbon monoxide and hydrocarbons more strongly than nitrogen, oxygen and argon.

In the operation of the system of FIG. 3, a compressed stream of air is introduced into prepurification unit 112 through line 114. The pre-purified air leaving unit 112 is cooled and then introduced into cryogenic adsorption unit 130. The carbon monoxide in the pre-purified air stream is removed therefrom in unit 130, as described above with reference to FIG. 1, thereby producing a carbon monoxide-depleted air stream, which leaves unit 130 through line 132, and a waste stream which leaves unit 130 through line 134. The carbon monoxide-depleted pre-purified air stream next enters high pressure column 104 of unit 102. The operation of unit 102 in FIG. 3 is the same as the operation of this unit in FIG. 2 except that the nitrogen-enriched product exiting low pressure column 106 is now a high purity product and thus requires no further purification.

For efficient operation of unit 130 the prepurified air stream entering this unit should be in the vapor form. Accordingly the temperature of the air feed stream to unit 130 should be between its dew point at the existing pressure and 750° K. The preferred operating conditions for cryogenic adsorption system 130 in this embodiment include a temperature between 90° and 725° K. and a pressure between 4.0 and 20.0 atmospheres.

For the embodiments in FIGS. 2 and 3, the cryogenic distillation step usually carried out at a temperature between 90 and 125° K.

The invention is further exemplified by the following examples, in which parts, percentages and ratios are on a volume basis, unless otherwise indicated.

EXAMPLE I

Commercially available 5A zeolite, copper-exchanged Y zeolite, 13X zeolite and calcium-exchanged X zeolite were evaluated for carbon monoxide and nitrogen separation selectivity using an adsorption microbalance. In the experiments the measurement of carbon monoxide and nitrogen adsorption isotherms was carried out at pressures between 0 and 1 pound per square inch absolute (psia) and at a temperature of 87° K. All of the adsorbents adsorbed carbon monoxide in preference to nitrogen. The 5A zeolite had the greatest carbon monoxide adsorption capacity and the best carbon monoxide to nitrogen selectivity.

EXAMPLE II

A two inch diameter adsorption vessel containing 950 grams of 5A zeolite was regenerated with carbon monoxide-free nitrogen at a temperature of 250° C. to remove residual moisture. The vessel was then immersed in liquid argon maintained at a pressure of one atmosphere absolute, thereby cooling it to 87° K. Nitrogen containing 0.6 parts per million (ppm) carbon monoxide was passed through the bed at a pressure of 30 pounds per square inch gauge (psig) and an average flow rate of 21 standard liters per minute (slpm). Standard conditions refer to one atmosphere absolute and 21° C. (70° F.). The carbon monoxide concentration in the vessel effluent was measured continuously using a model RGA-3 analyzer (manufactured by Trace Analytical Corporation). The analyzer had a carbon monoxide detection limit of 0.4 parts per billion (ppb). The experiment was continued for a period of 266 hours before carbon monoxide breakthrough (defined as 1 ppb carbon monoxide) was detected.

EXAMPLE III

Air containing about 0.7 ppb carbon monoxide was passed through the vessel described in Example II at an absolute pressure of 6 atmospheres and a flow rate of 15 slpm. The bed in the vessel was maintained at a temperature of 105° K. by immersion in a bath of liquid argon maintained at a pressure of 4.7 atmospheres absolute. The carbon monoxide concentration in the effluent remained below 1.0 ppb for a period of over 14 hours.

The above examples illustrate the effectiveness of the invention for adsorbing carbon monoxide from nitrogen using various adsorbents at cryogenic temperatures and for adsorbing carbon monoxide from air using 5A zeolite.

Although the invention is described with particular reference to specific embodiments, variations of these embodiments are contemplated. For example two or more adsorbents can be used in combination either in mixed form or in serially-connected beds. The scope of the invention is limited only by the breadth of the appended claims.

What is claimed is:

1. A temperature swing adsorption process for removing carbon monoxide from a gaseous nitrogen stream which contains carbon monoxide as an impurity comprising the step of passing said gaseous nitrogen stream through a bed of carbon monoxode-selective adsorbent at a temperature below about 150° K., thereby producing a substantially carbon monoxide-free nitrogen stream.

2. A temperature swing adsorption process for removing carbon monoxide from an air stream which contains carbon monoxide as an impurity comprising the step of passing said air stream through a bed of carbon monoxide-selective adsorbent at a temperature between the dew point of air at the pressure in said bed and about 150° K., thereby producing a substantially carbon monoxide-free air stream.

3. The process of claim 1 or claim 2, wherein said carbon monoxide-selective adsorbent is selected from type A zeolite, type X zeolite, type Y zeolite, mordenites and mixtures thereof.

4. The process of claim 1 or claim 2, wherein said carbon monoxide-selective adsorbent is selected from a calcium exchanged X zeolite, 5A zeolite, 13X zeolite and mixtures thereof.

5. The process of claim 1 or claim 2 further comprising regenerating said adsorbent at a temperature in the range of about −20° to 250° C., thereby desorbing said carbon monoxide from said adsorbent.

6. The process of claim 1, wherein said nitrogen stream contains up to about 100 ppm carbon monoxide.

7. The process of claim 2, wherein said air stream contains up to about 100 ppm carbon monoxide.

8. The process of claim 1 or claim 2, wherein said adsorption process is carried out at an absolute pressure in the range of about 1.0 to 20 atmospheres.

9. The process of claim 1 or claim 2 carried out in a plurality of adsorption beds operated out of phase with one another such that at least one bed is undergoing adsorption while at least one other bed is undergoing desorption.

10. A temperature swing adsorption process for producing a nitrogen product stream containing not more than 0.5 ppm carbon monoxide from air containing up to about 100 ppm of carbon monoxide as an impurity comprising the steps of:
    (a) cryogenically distilling said air, thereby producing a nitrogen-enriched gaseous stream containing said carbon monoxide;
    (b) adsorbing carbon monoxide from said nitrogen-enriched gaseous stream by passing said nitrogen-enriched gaseous stream through a bed of carbon monoxide-selective adsorbent at a temperature in the range of about 77° to 150° K.

11. A temperature swing adsorption process for producing a nitrogen product stream containing not more than 0.5 ppm carbon monoxide from an air stream containing up to about 100 ppm of carbon monoxide as an impurity comprising the steps of:
    (a) passing said air stream through a bed of carbon monoxide-selective adsorbent at a temperature in the range of about 90° to 150° K., thereby producing substantially carbon monoxide-free air;
    (b) cryogenically distilling the substantially carbon monoxide-free air, thereby producing a substantially carbon monoxide-free nitrogen-enriched stream.

12. The process of claim 10 or claim 11, wherein the cryogenic distillation step is carried out at a temperature in the range of about 90° to 125° K.

13. The process of claim 10 or claim 11, wherein the adsorption step is carried out at an absolute pressure of about 1 to 20 atmospheres.

14. The process of claim 10 or claim 11, wherein said adsorbent is selected from type A zeolite, type X zeolite, type Y zeolite, mordenite and mixtures thereof.

15. The process of claim 10 or claim 11, wherein said adsorbent is selected from calcium exchanged X zeolite, 5A zeolite, 13X zeolite and mixtures thereof.

* * * * *